United States Patent [19]
Mühlhausen

[11] Patent Number: 5,772,245
[45] Date of Patent: Jun. 30, 1998

[54] VEHICLE BODY

[75] Inventor: Mark Mühlhausen, Stuttgart, Germany

[73] Assignee: Mercedes-Benz AG, Stuttgart, Germany

[21] Appl. No.: 958,874

[22] Filed: Oct. 27, 1997

Related U.S. Application Data

[63] Continuation of Ser. No. 620,560, Mar. 25, 1996, abandoned.

[30] Foreign Application Priority Data

Mar. 24, 1995 [DE] Germany .......................... 195 10 763.2

[51] Int. Cl.$^6$ .................................................. B62D 21/15
[52] U.S. Cl. ............................ 280/784; 180/232; 296/189
[58] Field of Search ..................................... 280/781, 784, 280/785; 180/232; 296/188, 189

[56] References Cited

U.S. PATENT DOCUMENTS

| | | | |
|---|---|---|---|
| 3,328,048 | 6/1967 | Hoglund et al. .......................... | 280/781 |
| 3,822,907 | 7/1974 | Appel et al. ................................ | 293/63 |
| 4,194,763 | 3/1980 | Reidelbach et al. ...................... | 280/784 |
| 4,440,435 | 4/1984 | Norlin ....................................... | 280/784 |
| 4,453,740 | 6/1984 | Von Der Ohe et al. .................. | 280/781 |
| 5,372,216 | 12/1994 | Tsuji et al. . | |

FOREIGN PATENT DOCUMENTS

| | | |
|---|---|---|
| 421277A1 | 4/1991 | European Pat. Off. . |
| 477654 | 4/1992 | European Pat. Off. ................ 280/781 |
| 602331 | 6/1994 | European Pat. Off. ................ 280/781 |
| 679564A1 | 11/1995 | European Pat. Off. . |
| 1780435 | 2/1972 | Germany . |
| 2255963 | 5/1974 | Germany . |
| 3301708 | 8/1984 | Germany . |
| 3522447 | 7/1986 | Germany . |
| 3927924 | 8/1990 | Germany ............................... 280/785 |
| 32461 | 10/1986 | Japan . |
| 3-25082 | 2/1991 | Japan ..................................... 280/781 |
| 4146874 | 5/1992 | Japan . |

*Primary Examiner*—Paul N. Dickson
*Attorney, Agent, or Firm*—Evenson McKeown Edwards & Lenahan PLLC

[57] ABSTRACT

Vehicle bodies having a mounting frame fastened to a floor frame lead to damage to the mounted assemblies and floor frame when, for example, the engine assembly is arranged directly adjacent to the vehicle front or rear side. It is proposed to provide a crossmember of the mounting frame as a member for the bumper and to provide in the side members, in the region of the other crossmember, deformation zones which, in the event of a collision at relatively low speed, allow a displacement of the entire mounting frame together with the built-in assemblies, without the floor frame being damaged. The mounting frame is usable for vehicles with a rear or front engine.

16 Claims, 1 Drawing Sheet

VEHICLE BODY

This application is a continuation of application Ser. No. 08/620,560, filed on Mar. 25, 1996, now abandoned.

BACKGROUND AND SUMMARY OF THE INVENTION

The invention relates to a vehicle body having a mounting frame which consists of front and rear crossmembers and of two side members connecting these crossmembers and provided with mounting points for receiving the engine, transmission and/or axle assemblies and which is screwed to the floor frame of the vehicle, one of the crossmembers serving as a member for the bumper.

It is known to use so-called integral members as the mounting frame for the engine, transmission and axle assemblies, to connect these parts to the mounting frame and then to arrange them as a whole in the vehicle by screwing to the floor frame. The advantage of these mounting frames is the possibility of premounting subassemblies and of inserting them as a complete part into the vehicle.

In vehicles, in which, for example, the engine is arranged directly adjacent to the rear side or front side, in the event of a front or rear collision there is the risk of damage to the engine and to the vehicle floor frame even when the collision occurs with relatively low energy and would normally have led only to petty damage. A design of this type is known for example, from German Patent Document DE 3,522,447 C2.

It is also known from German Published Patent Application 1,780,435 to attach axle assemblies to the vehicle outer frame via frame-like components by fastening means which are dimensioned for absorbing a set force peak and which, when the force peak is exceeded, either stretch or even rupture. Similarly dimensioned fastening means can also be provided for the engine assembly, as is known from the Abstract of Japanese Patent Document JP 4-146874 (A), which, however, if it is located in the front or rear region, is nevertheless damaged directly in the event of a collision.

It is also known from German Patent Document DE 3,301,708 A1 to attach an engine transmission block to the vehicle body via a bearing point capable of energy-consuming deformation, in order to prevent a deformation of the vehicle body in the event of an accident. However, it is not possible to prevent the engine transmission block itself from being damaged. German Published Patent Document Application 2,255,963 also provides only the energy-absorbing mounting of a drive assembly on the vehicle body and no closed mounting frame.

An object on which the invention is based is, for vehicle bodies having a mounting frame, to seek a solution by means of which the assemblies held in the frame are themselves protected, at least in the event of a collision at relatively low speeds, and damage to the floor frame is also prevented.

To achieve this object, there is a provision according to the invention, in a vehicle body of the type mentioned in the introduction, for the support points of the mounting frame on the vehicle floor frame to be arranged in the region of the crossmember which is located opposite the crossmember serving as a bumper member and for arranging deformation regions in the side members between the mounting points provided on the side members and the second crossmember in the direction of travel.

As a result of these measures, the mounting frame also forms a protective frame for the assemblies mounted in it, because a shock exerted on the bumper can be absorbed by a crossmember of the mounting frame and does not act on the assemblies. Since deformation regions are provided in the side members between the support points on the floor frame and the assembly suspension, the design according to the invention guarantees that, in the event of a petty or minor accident, the engine transmission unit moves forwards or rearwards, together with the crossmember serving as bumper, and the mounting frame alone experiences the necessary deformation, without the possibility of damage to the primary structure of the floor frame.

The design according to the invention of the mounting frame therefore also makes it possible to connect the engine directly to the bumper crossmember which is now part of the mounting frame, so that there is freedom in the utilization of space.

Other objects, advantages and novel features of the present invention will become apparent from the following detailed description of the invention when considered in conjunction with the accompanying drawings.

DETAILED DESCRIPTION OF THE DRAWINGS

Figure 1:
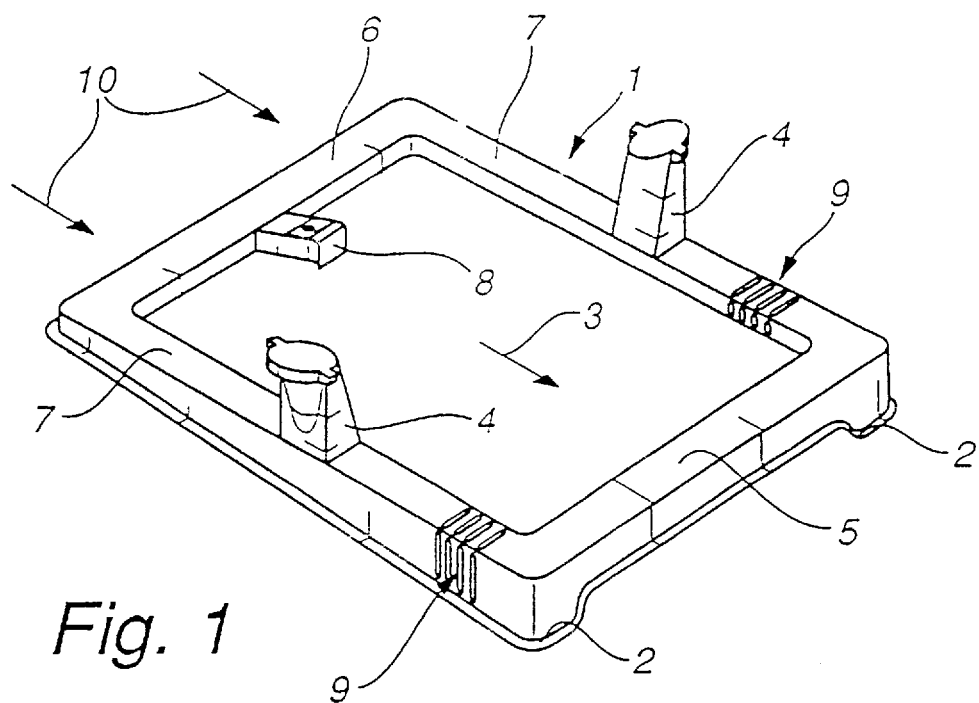
FIG. 1 is a schematic perspective view which shows a first embodiment of a mounting frame according to the invention.

FIG. 1 shows a mounting frame (1) which is formed from an angular profile and which is provided in a way known per se, on its side in front in the direction of travel (3), with support points (2) for fastening to a vehicle floor frame (not shown). The mounting frame (1) consists of a front crossmember (5) and of a rear crossmember (6) as well as side members (7) which connect these and which are provided with mounting points in the form of support brackets (4) for the arrangement of an engine assembly transmission assembly and/or an axle assembly which is not shown and which can additionally also be fastened at other points, for example to the carrier piece (8) on the mounting frame (1), although the carrier piece (8) can, on the other hand, also be connected to the vehicle floor frame flexibly.

The side members (7) are provided between the mounting points (4) and the front crossmember (5) or its support points (2) in each case with deformation zones (9) in the form of a plurality of longitudinal slots arranged parallel to one another. In the exemplary embodiment illustrated, the rear crossmember (6) serves directly as a member for a bumper (not shown), so that, in the event of a rear collision, the mounting frame (1) designed as an integral member, is loaded in the direction of the arrows (10) with forces which, if they are high enough, lead to a deformation of the deformation zones (9), but without excessive forces in these being introduced to the floor frame (not shown) from the support points (2). The engine transmission assembly (not shown) or the axle assembly itself cannot be damaged in the event of such a collision, even if they are arranged directly adjacent to the rear end and therefore adjacent to the crossmember (6).

Figure 2:
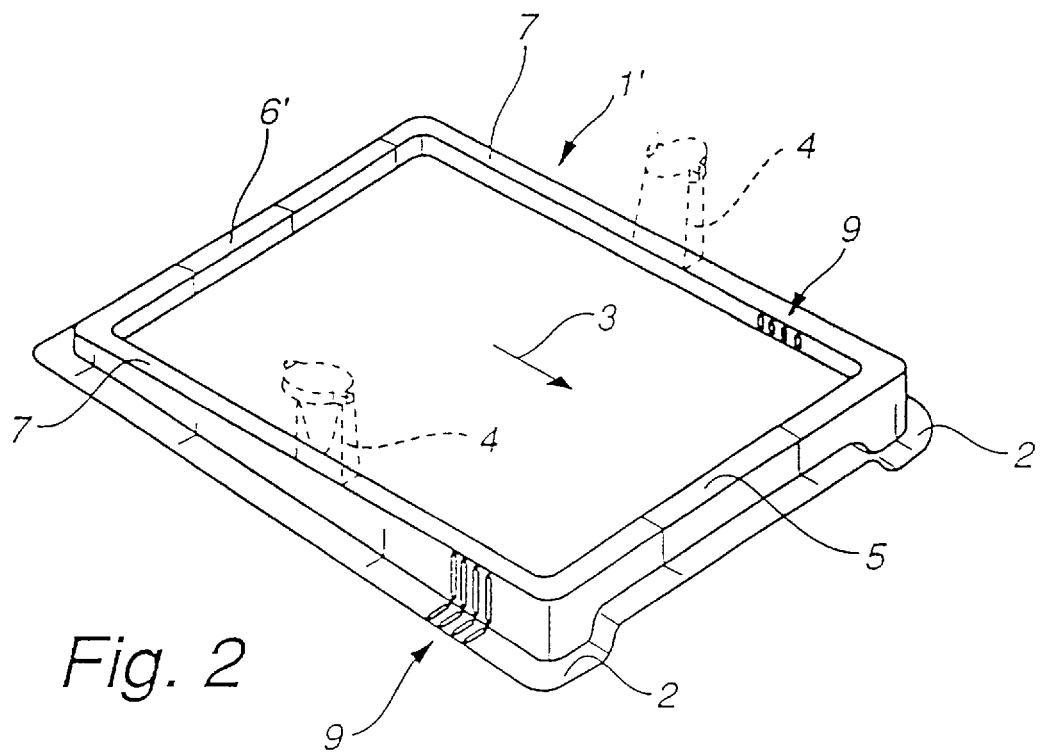
FIG. 2 is a schematic perspective view which shows an alternative version of the embodiment of FIG. 1.

FIG. 2 shows a slight modification in the profile shape of the mounting frame (1'), although like parts have been provided with the same reference symbols. Here, provision is made for arranging deformation zones (9) between the front crossmember (5') having the support points (2) and the mounting points (4). The rear crossmember (6') serves as a member for the bumper (not shown).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vehicle body assembly connectible to a vehicle floor frame, comprising:

a first crossmember;

a second crossmember;

a pair of side members connected to the first and second crossmembers to thereby form a rectangular subframe composed of said side members and crossmembers, said subframe being configured to support a vehicle subassembly comprising one of a vehicle engine, a vehicle transmission and a vehicle axle assembly when said subframe is in an in use position on a vehicle, mounting points provided on said side members for mounting the vehicle subassembly to the subframe, said first crossmember being formed as a vehicle bumper support member which in use is disposed on a vehicle end, support points provided on said subframe at a position located adjacent said second crossmember for connecting the subframe to a vehicle floor frame, and deformation regions disposed in the side members at a position intermediate the mounting points and the support points, whereby collision impact forces against said first crossmember are absorbed by said deformation regions while said vehicle subassembly is protected from damage by being carried with the first crossmember, the mounting points, and portions of said side members at a side of the deformation regions opposite said second crossmember.

2. Vehicle body assembly according to claim 1, wherein said first crossmember is disposable at a rear end of a vehicle.

3. Vehicle body assembly according to claim 2, wherein said subframe is configured to support a rear engine of a vehicle.

4. Vehicle body assembly according to claim 2, wherein said subframe is configured to support a transmission assembly of a vehicle.

5. Vehicle body assembly according to claim 1, wherein said deformation regions are formed by a plurality of slots cut into respective regions of said side members at a position intermediate said support points and said mounting points.

6. Vehicle body assembly according to claim 2, wherein said deformation regions are formed by a plurality of slots cut into respective regions of said side members at a position intermediate said support points and said mounting points.

7. Vehicle body assembly according to claim 3, wherein said deformation regions are formed by a plurality of slots cut into respective regions of said side members at a position intermediate said support points and said mounting points.

8. Vehicle body assembly according to claim 4, wherein said deformation regions are formed by a plurality of slots cut into respective regions of said side members at a position intermediate said support points and said mounting points.

9. Vehicle body assembly according to claim 1, wherein said support points are provided at said second crossmember.

10. Vehicle body assembly according to claim 8, wherein said support points are provided at respective opposite lateral ends of said second crossmember.

11. Vehicle body assembly according to claim 1, wherein said support points are provided at said second crossmember.

12. Vehicle body assembly according to claim 11, wherein said support points are provided at respective opposite lateral ends of said second crossmember.

13. Vehicle body assembly according to claim 9, wherein said subframe is configured to support a rear engine of a vehicle.

14. Vehicle body assembly according to claim 10, wherein said subframe is configured to support a rear engine of a vehicle.

15. Vehicle body assembly according to claim 8, wherein said subframe is configured to support a transmission assembly of a vehicle.

16. Vehicle body assembly according to claim 10, wherein said subframe is configured to support a transmission assembly of a vehicle.

* * * * *